June 30, 1953  M. CORPORA  2,644,149
AUTOMOBILE DIRECTIONAL SIGNAL CONTROL
Filed Nov. 25, 1950
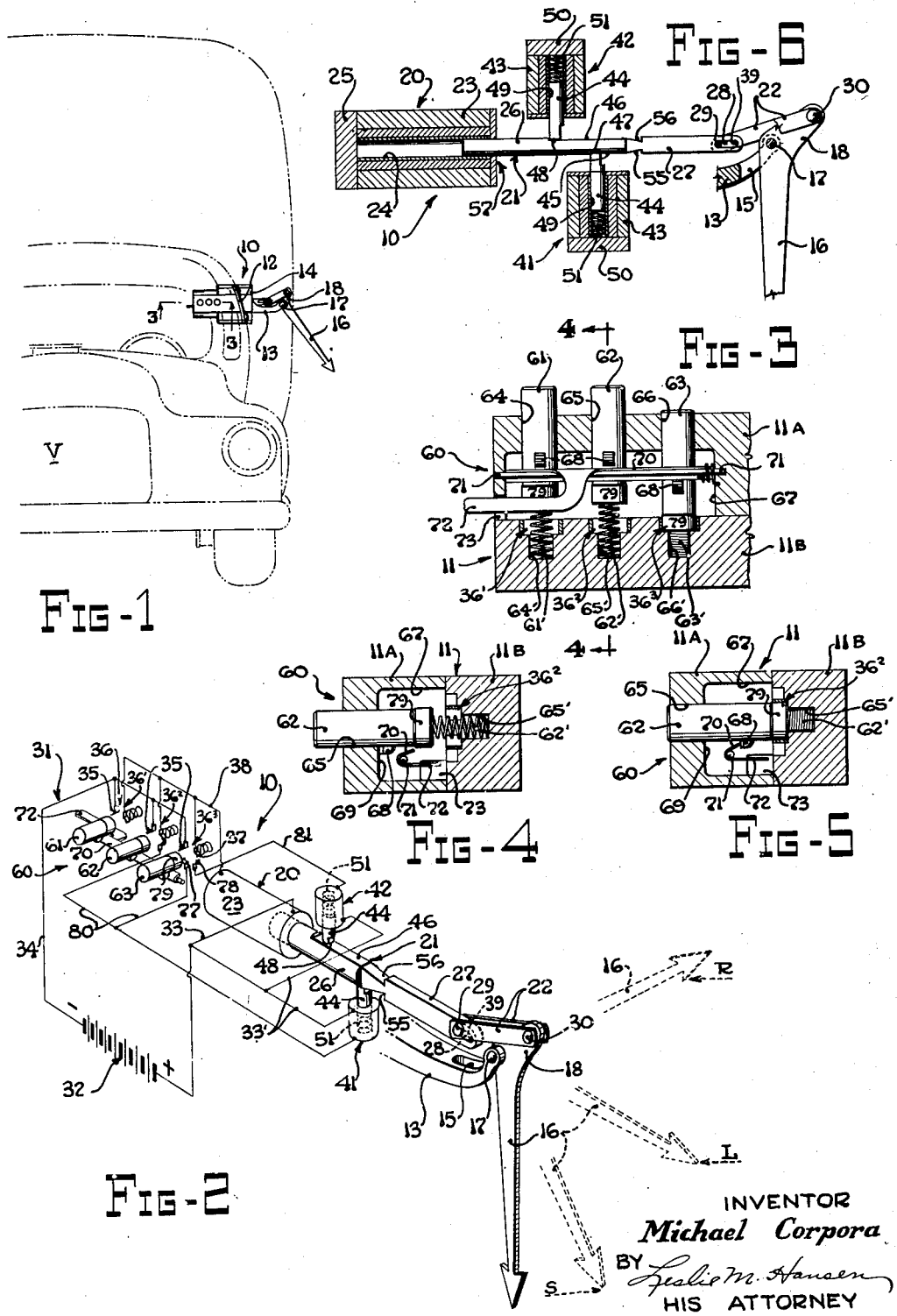
INVENTOR
Michael Corpora
BY Leslie M. Hansen
HIS ATTORNEY Patented June 30, 1953

2,644,149

UNITED STATES PATENT OFFICE 2,644,149

AUTOMOBILE DIRECTIONAL SIGNAL CONTROL

Michael Corpora, Mountain View, Calif., assignor of forty per cent to Joseph Richard Viviano, Mountain View, Calif.

Application November 25, 1950, Serial No. 197,540

2 Claims. (Cl. 340—128)

This invention relates to an automobile directional signal and more particularly to an improved and simplified control means for such signal device.

The present invention is directed to certain novel improvements in the control means for automobile directional signals shown, described and claimed in my United States Patent No. 2,186,098 which issued January 9, 1940.

The invention herein contemplates the provision of a packaged unit including a signal arm mounted for movement exteriorly of the cab of a motor vehicle and control means for said arm within said cab for manipulation by the person driving the vehicle.

An object of the present invention is to provide a driver controlled signal means for indicating to others the intention of the driver to either slow down his vehicle or to turn it to the left or the right.

Another object is to provide a simple yet effective arrangement of parts for positively actuating the signal arm in accordance with manipulations of a push-button control therefor.

Still another object is to provide a master solenoid for effecting movement of the signal arm and intermediate solenoid operated means for limiting or altering the normal movement of the signal arm.

These and other objects and advantages of the present invention will become apparent in the following description in connection with the drawing in which:

Fig. 1 is a front view of my signal device mounted on a vehicle shown in phantom.

Fig. 2 is a perspective view of the principal parts of my signal device including the wiring diagram therefor.

Fig. 3 is a fragmentary sectional detail view of the control portion of my signal device taken substantially along line 3—3 in Fig. 1.

Fig. 4 is a transverse section of Fig. 3 taken along line 4—4 thereof.

Fig. 5 is a view similar to Fig. 4 but with parts thereof in a different position.

Fig. 6 is a sectional detail of the signal arm actuating portion of my signal device, parts thereof being broken away for purposes of illustration.

The signal device 10 comprises a housing or casing 11 having a flange-like escutcheon plate 12 around it for mounting the casing on the body of a vehicle V as seen in Fig. 1. A bracket 13 extends outwardly from the exterior wall 14 of the casing 11 and is provided with a fork-like end 15 for receiving a signal arm 16 in the manner shown in Figs. 2 and 6.

Each side of the fork-like end 15 is provided with a boss through which a pin 17 extends. The pin 17 also passes through the arm 16 to support the latter for pivotal movement relative to the bracket 13.

The signal arm 16 comprises an elongated arrow which hangs pendently from the pin 17. The upper end of the arm 16 has an angularly extending portion 18 provided with an opening (not shown) eccentrically disposed relative to the pin 17.

Means for moving the arm 16 comprises a master solenoid 20 confined within the housing 11 and including an armature 21 having its outer end operatively connected by a link 22 to the eccentrically disposed opening in the arm 16.

The solenoid 20 includes a cylindrical coil 23 having a tubular core 24 disposed to guide the armature 21 toward and from the pin 17 upon which the arm 16 is mounted. The back of the solenoid is formed by an iron base 25 for concentrating the eddy currents developed by the coil 23 to the inner region of the tubular core 24.

The armature 21 has a rounded portion 26 disposed for sliding movement within the tubular core 24 and its opposite or extended end 27 flattened to fit between twin links 22. The free end of the flat portion 27 of the armature is provided with an elongated slot 28 to receive a pin 29 extending between and joining the twin links 22. The opposite ends of the twin links carry a pin 30 which extends through the aforementioned eccentrically disposed opening in the arm 16.

The coil 23 of the solenoid 20 is embodied in an electrical circuit 31 shown diagrammatically in Fig. 2. This circuit 31 includes a source of electrical energy 32 in the form of a storage battery usually found in automotive vehicles. One terminal of the coil 23 is connnected by a conductor 33 to the positive side of the battery 32, the opposite negative side of which is connected by a conductor 34 to one pole 35 of a switch 36. The other pole 37 of switch 36 is connected by a conductor 38 to the other terminal of the coil 23. When the switch 36 is closed current from the battery 32 flows through the coil 23 and the eddy currents set up within the tubular core 24 attract the armature 21 drawing it back into the core 24. In this manner the links 22 are pulled back to turn the arm 16 counterclockwise Fig. 2 about the pin 17.

When the switch 36 is opened to break the circuit 31 the arm 16 falls into normal or pendent position. The falling arm 16 causes the twin links 22 to pull the armature 21 outwardly relative to the tubular core 24 of the solenoid 20. However, the arm 16 in falling into normal position gains momentum and will swing in pendulum fashion beyond vertical. In this manner the pin 29 within the slot 28 in the armature bears against the outermost cove 39 in the latter. Thus the armature 21 is fully drawn into its outermost or extended position by the arm 16 although the arm 16 finally hangs vertically from its pivotal mount on the pin 17. In other words, by reason of the pin and slot connection (29—28) between the armature and the twin links 22 the pin 29 is free to move within the slot 28 of the armature 21 without disturbing the disposition of the latter in its fully extended position.

By reason of the foregoing pin and slot connection, the armature 21 is normally free for an initial movement independent of movement of the links 22 and the signal arm 16. Consequently, when the switch to the circuit 31 is closed to energize the coil 23, the first impulses of the eddy currents set up within the core 24 act upon the armature alone without resistance from the links and signal arm. This is important since the pulling strength of the coil 23 upon the armature is weakest at the outset and is enhanced in proportion to the amount of peripheral area of the armature drawn into the core 24. Moreover, the armature gains momentum as it is drawn into the core so that by the time the cove 39 of the slot 28 engages the pin 29, the resistance offered by the depending signal arm 16 is more easily overcome.

Under ordinary conditions the armature 21, when fully drawn into the core 24, would pull the signal arm into its uppermost dotted line position in Fig. 2. However, in accordance with the present invention the full stroke of the armature 21 is limited for holding the signal arm 16 in various intermediate positions.

The means for limiting the normal movement of the signal arm, as best seen in Figs. 2 and 6, comprise a pair of intermediate solenoids 41 and 42 and related mechanisms. Each of the solenoids 41 and 42 includes a coil 43 and an armature 44 disposed so that each of their armatures reciprocate in a path transverse to that of the armature 21 of the master solenoid 20. The intermediate solenoid 41 is disposed diametrically opposite to the other solenoid 42 so that the armature of each engages the armature 21 from the opposite side with respect to each other. In this connection, each side of the armature 44 is provided with a flat surface 45 and 46, respectively, engageable by the free end 47 and 48 respectively, of the armature 44 on the corresponding side.

The coil 43 of each intermediate solenoid is similar to, but smaller than the coil of the master solenoid 20 in that each has a tubular core 49 and an iron base 50. These intermediate solenoids differ from the master solenoid in that they are each provided with a compression spring 51 disposed within the core 49 behind the armature 44.

In each solenoid 41 and 42 the spring 51 thereof bears against the base 50 and normally urges the respective armature 44 toward the master armature 21. These compression springs are of slight compression strength so as not to retard normal attraction of the armature 44 by the eddy currents within the core 49. However, the springs 51 are of sufficient strength to press and maintain the respective armatures against the master armature 21 when the coils 43 are de-energized. It should be understood further that the action of these springs 51 in pressing their armatures against the sides of the master armature offer a minimum amount of resistance to the latter's movement due to eddy current induced by the coil 23. This resistance can be kept at the very minimum by lubricating the flat surfaces 45 and 46 against which the free ends 47 and 48, respectively, of the armatures 44 abut.

Each of the flat surfaces 45 and 46 extend to the free end of the rounded portion 26 of the armature 21 to terminate in a notch 55 and 56, respectively. These notches 55 and 56 are formed in the flattened end of the master armature at the point of connection with the rounded portion 26 thereof.

The solenoid 42 is disposed substantially midway the distance between the front face 57 of the master solenoid and the notch 56 in the armature 21 thereof. The solenoid 41 is disposed substantially midway the distance between the axis of solenoid 42 and the notch 55 in the master armature 21. From the foregoing it will be apparent that the movement of the master armature will be limited to about one quarter of its full stroke when the end 47 of the armature of solenoid 41 engages the notch 55 of the master armature. Should solenoid 41 be energized in a manner later to be explained, the end 48 of the armature of solenoid 42 will engage the notch 56 to limit the movement of the master armature to approximately one half of its full stroke. Only when both intermediate solenoids 41 and 42 are energized will the master armature 21 be free to move the full stroke to raise the signal arm 16 into its uppermost position as hereinbefore explained.

Referring now to Fig. 2 the uppermost position assumed by the signal arm 16 is indicated in dotted lines at R. This signals other persons observing the vehicle V that the latter is about to be turned to the Right. When the master armature is limited to one half its full stroke by the intermediate solenoid 42 the signal arm 16 will assume the dotted line position L, namely, horizontally of the casing 11. This signals persons observing the vehicle V that it is about to be turned to the Left. Limitation of the master armature 21 to one quarter its full stroke effects movement of the signal arm 16 to the dotted line position S in Fig. 2, full lines Fig. 1. This indicates to observers that the vehicle V is about to slow down or stop. When the master solenoid 20 is de-energized the signal arm 16 is free to hang in vertical, pendently supported, position. In this latter case the arm 16 is within the lateral limits of the body of the vehicle so that it cannot be seen from the rear of the vehicle.

The control means 60 of the present invention is shown in detail, Figs. 3, 4 and 5 and diagrammatically in Fig. 2. The control means includes a plurality of push buttons 61, 62 and 63 arranged for reciprocation within passages 64, 65, and 66, respectively, in the casing or housing 11. In this connection it will be noted that the housing consists of two sections 11A and 11B joined in the usual manner by a screw or bolt (not shown). The section 11A of the housing is provided with an internal chamber 67 communicating with the passages 64, 65 and 66 so that the inner ends of the push buttons 61, 62 and 63 are confined within the chamber 67. Also communicating with the chamber 67 are recesses 64', 65' and 66' formed in the inner face of section 11B of the housing 11 in axial alignment with the push buttons 61, 62 and 63, respectively. A compression spring 61', 62' and 63' disposed in the recesses 64', 65' and 66', respectively, bear against the inner end of the corresponding push button 61, 62 and 63 to urge the latter into fully extended position relative to the casing 11. Each push button is provided with a stop dog 68 adapted to bear against the inner face 69 of the chamber 67 to thereby limit outward movement of the push buttons.

The stop dog 68 on any one push button is adapted to cammingly engage a stop bar 70 pivotally mounted as at 71 within the chamber 67 (Figs. 3, 4 and 5) and spring urged so as to hold the push buttons in fully depressed position against the action of their compression springs. The stop bar 70 has a handle 72 which extends through an opening 73 in one side wall of the chamber 67 for manipulation exteriorly thereof. This handle 72 enables the driver to turn the stop bar 70, clockwise Figs. 4 and 5, out of engagement with the stop dog 68 of any push button in depressed position.

Each push button 61, 62 and 63 in the foregoing arrangement is associated with a switch embodied in the electrical circuit 31, hereinbefore explained. The switch referred to in each instance includes the switch 36 for controlling the circuit to the coil 23 of the master solenoid 20. For purposes of clarity and distinction the switch 36 which is associated with the push button 61 is designated 36¹; the one associated with push button 62 is marked 36² and the one associated with push button 63 is identified as switch 36³.

Each of the poles 35 and 37 of the foregoing switches comprise quadrantal arcuate strips disposed within the enlarged mouth of the respective recesses 64', 65' and 66'. The recesses 65' and 66' each include an additional arcuate strip or pole piece 77 and the recess 66' includes still another of such poles 78. These pole pieces 35, 37, 77 and 78 are insulated from each other but are arranged in a circle in each recess to contact a conductor ring 79 carried on the inner end of the respective push button.

The pole piece 77 in each recess 65' and 66' is connected by a conductor wire 80 to one terminal of the coil 43 of the intermediate solenoid 41. The pole piece 78 in recess 66' is connected by a wire 81 to one terminal of the coil of the other intermediate solenoid 42. The opposite terminal of the coil of each intermediate solenoid 41 and 42 is connected by wire 33' to the conductor 33 which runs to the positive side of the battery 32.

From the foregoing it will be apparent that each intermediate solenoid 41 and 42 is embodied in the electrical circuit 31 for control independently of the master solenoid but simultaneously therewith by reason of the auxiliary circuits and switches associated with the particular push buttons in the control means. The following is summarily descriptive of the operation of the signal device 10 to indicate first Right hand turn; then Left hand turn; and finally the Slow Down or Stop signal.

Since indication of a Right hand turn by the signal arm 16 requires a full stroke of the master armature 21, all solenoids 20, 41 and 42 must be energized. Consequently, push button 63 is depressed into the position illustrated in Fig. 3 to latch the button 63 in a position with its conductor ring 79 contacting all of the pole pieces 35, 37, 77 and 78 in the recess 66'. In this manner the coils 43 of both intermediate solenoids 41—42 are energized to withdraw their armatures 44 against the action of their respective compression springs 51. Thus the free ends 47 and 48 of both armatures 44 are held out of engagement with the surfaces 45—46 of the master armature and the latter is free to withdraw fully into the core 24 of the master solenoid. The signal arm 16 is thus held in its uppermost position R, Fig. 2 until the handle 72 is depressed to trip or release the stop bar 70 from engagement with the stop dog 68 on the push button 63. Thereupon the spring 63' forces the push button into its normal or extended position to disconnect the several pole pieces in the switch 36³.

When it is desired to indicate that a Left turn of the vehicle is to be made the push button 62 is depressed in the manner as hereinbefore explained in connection with the push button 63. Thus the conductor ring 79 on button 62 completes the circuit through the pole pieces 35, 37 and 77 to energize the master coil 23 and the coil 43 of the intermediate solenoid 41 only. In this manner the free end 47 of the armature of solenoid 41 is withdrawn from engagement with the master armature 21. This frees armature 21 for withdrawal until its movement is limited by engagement of the free end 48 of the armature of solenoid 42 with the notch 56 in the master armature 21. The armature 21 is thus withdrawn to only about one half its normal full stroke so that the signal arm 16 is raised into position L, Fig. 2, where it is held until the stop arm 70 is tripped to release the push button 62.

When the vehicle is to Slow Down or Stop push button 61 is depressed. In this case only the pole pieces 35 and 37 engage the conductor ring 79 of the push button 61. Consequently both intermediate solenoids 41—42 remain de-energized and movement of the master armature 21 is limited to about one quarter its full stroke. In other words, the free end 47 of the armature in solenoid 41 is urged into the notch 55 of armature 21 as soon as they register with each other. Thus, the signal arm 16 is raised only partially to assume position S where it is held until the stop arm 70 is tripped in the usual manner.

From the foregoing it will be apparent that the present invention provides a simple yet positive signal arm control. While the latter has been described in specific detail it will be apparent that it can be modified, altered or varied without departing from the spirit of my invention. I therefore desire to avail myself of all modifications, alterations and/or variations as fairly come within the scope of the appended claims.

What I claim as new and desire to protect by Letters Patent is:

1. The combination with a signal arm pivotally mounted for swinging movement in a vertical plane, of means for controlling said signal arm for movement into various positions laterally of its pivotal mounting, comprising a master solenoid having its armature disposed for reciprocation within said plane, link means pivotally connected to said signal arm eccentrically of its pivotal mounting and having a pin and slot connection with the free end of said master armature whereby the latter is free for initial movement independent of said link means and signal arm, an electrical circuit including a primary switch for energizing said master solenoid for swinging said signal arm into fully raised position, a first and a second intermediate solenoid each having its armature disposed for reciprocation transverse of the movement of said master armature and urged against the latter, stop means on said master armature engageable by the armature of the first of said intermediate solenoids upon movement of said master armature at least one quarter its full stroke and engageable by the armature of the second of said intermediate solenoids upon movement of said master armature at least one half its full stroke, and separate switch means for optionally completing said circuit to either all of said solenoids, the first intermediate and master solenoids or the master solenoid only for swinging said signal arm into fully, partially or semi-partially raised position.

2. The combination with a signal arm pivotally mounted for swinging movement in a vertical plane, of means for controlling said signal arm for movement into various positions laterally of its pivotal mounting, comprising a master solenoid having its armature disposed for reciprocation within said plane, link means pivotally connected to said signal arm eccentrically of its pivotal mounting and having a pin and slot connection with the free end of said master armature whereby the latter is free for initial movement independent of said link means and signal arm, an electrical circuit including a primary switch for energizing said master solenoid for swinging said signal arm into fully raised position, a first and a second intermediate solenoid each having its armature disposed for reciprocation transversely the movement of said master armature and normally urged against the latter on opposite sides thereof, stop means on said master armature engageable by the armature of said first or second intermediate solenoid, said second intermediate solenoid being disposed midway the stroke of said master armature and said first intermediate solenoid being disposed midway the second of said solenoids and the stop means on said master armature, and separate switch means in said circuit for optionally energizing either all of said solenoids, the first intermediate and master solenoid, or the master solenoid alone for swinging said signal arm into fully, partially or semi-partially raised position.

MICHAEL CORPORA.

References Cited in the file of this patent

UNITED STATES PATENTS

| Number | Name | Date |
|---|---|---|
| 1,669,597 | Burson et al. | May 14, 1928 |
| 1,687,183 | Smith et al. | Oct. 9, 1928 |
| 1,757,674 | Lewis et al. | May 6, 1930 |
| 2,162,161 | Cotant | June 13, 1938 |
| 2,186,098 | Corpora | Jan. 9, 1940 |